Aug. 29, 1950     W. H. HILL     2,520,209
OPERATING MECHANISM FOR CHANGE SPEED GEARS
Filed July 3, 1947     2 Sheets-Sheet 1

Inventor:
William Henry Hill
By
Attorney.

Aug. 29, 1950     W. H. HILL     2,520,209
OPERATING MECHANISM FOR CHANGE SPEED GEARS
Filed July 3, 1947     2 Sheets-Sheet 2

Inventor
William Henry Hill
By
Attorney

Patented Aug. 29, 1950

2,520,209

UNITED STATES PATENT OFFICE 2,520,209

OPERATING MECHANISM FOR CHANGE SPEED GEARS

William H. Hill, Birmingham, England

Application July 3, 1947, Serial No. 758,751
In Great Britain September 2, 1944

Section 1, Public Law 690, August 8, 1946
Patent expires September 2, 1964

9 Claims. (Cl. 74—474)

This invention has reference to the operating mechanism of change speed gear boxes embodied in motor bicycles and similar motor driven road vehicles or appliances.

The custom of selecting the various gears in a gear box of the above kind, by means of a hand-controlled lever has fallen into disuse to a substantial extent and it is now more usual to effect the gear changes by a foot-controlled lever. Such a foot-controlled lever is fixed to a spindle projecting from the gear box and, internally, is adapted to make a limited angular movement in either of two opposite directions from a central position, for effecting a gear change, the lever and spindle being automatically returned to the said central position after each change. For this purpose, a suitable mechanism is provided internally of the box, for transmitting drive from the lever to a gear-selecting shaft and for returning the lever and spindle to its central position.

It will, therefore, be appreciated that when the gear box is of the type adapted for providing three or more gear ratios and in which there is only one neutral position of the gear-selecting shaft, it is frequently necessary to rock the foot lever two or more times before the neutral position of the gears can be selected.

With the object of overcoming this difficulty, it has already been proposed to provide a second or auxiliary foot-controlled lever upon the outside of the gear box, the said auxiliary lever being adapted to select the neutral position of the gears automatically by a single operation irrespective of the gear engaged prior to the said single operation.

The principal objects of the present invention are to provide an improved means of selecting neutral position of the gears, which is more simple in construction, more readily embodied in a gear box, less expensive to manufacture and more efficient in operation.

Further objects of the invention are to reduce the number of component parts which are subject to wear and tear and therefore be liable to become defective or inoperative, and to enable such component parts to be readily replaced if it should eventually be found necessary or advisable so to do.

These and other objects of the invention will be apparent from the specific embodiment of the invention illustrated in the accompanying drawings, in which.

Figure 1:
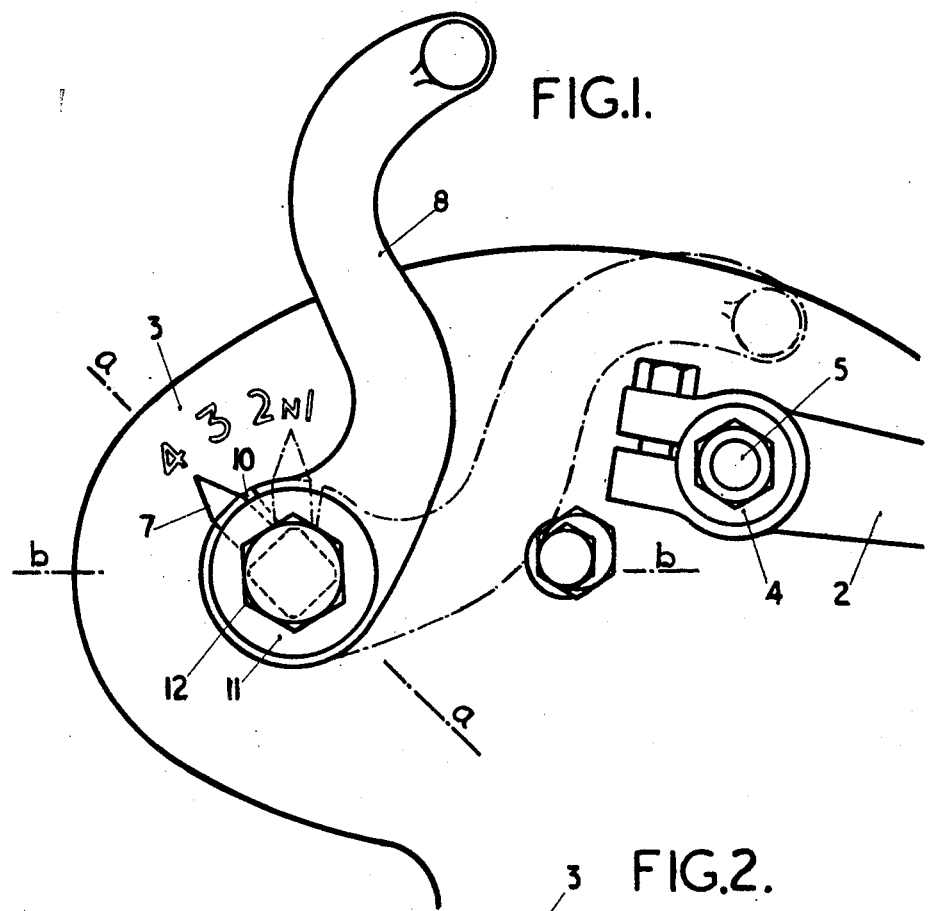
Figure 1 is an elevation of a part of a motor cycle gear box showing, in full lines, the position of the neutral-selecting lever when the top gear has been engaged.

In the mechanism shown in said drawings, angular movement is adapted to be imparted to a gear-selecting shaft 1 from a foot-operated gear-selecting lever 2, through a ratchet device which is housed within a cover plate 3 bolted or otherwise assembled to the gear box, and which ensures that each time the lever is raised or depressed for selecting a gear or for changing gear, the said lever is automatically returned to a central or intermediate position in readiness for a further operation.

The said gear selecting lever is rigidly secured upon a sleeve 4 which is rotatably mounted around a bolt 5 fixed to a wall of the gear box, the said sleeve and bolt projecting through an aperture in the cover plate.

One end of the gear operating shaft 1 is of square or non-circular shape in cross-section; this end is bored and internally tapped and extends into another aperture in the cover plate. A bush 6, having a radially projecting pointer 7, and an internal bore of the same cross-sectional shape as the said shaft end, is fitted on to the latter. Thus the shaft and bush rotate or turn as a unit about the axis of the shaft. Disposed around the bush is the hub of a neutral-selecting lever 8 which rotatably engages the cover-plate aperture or a lining 9 fitted therein. The said hub is formed with a radial slot 10 through which the pointer 7 projects so that drive may be transmitted through the pointer and bush, between the shaft 1 and neutral-selecting lever 8. The slot is of greater width than the pointer thereby providing a lost-motion coupling between the lever and the bush 6 or shaft 1 which permits a certain degree of relative movement between the shaft and lever.

Figure 2:
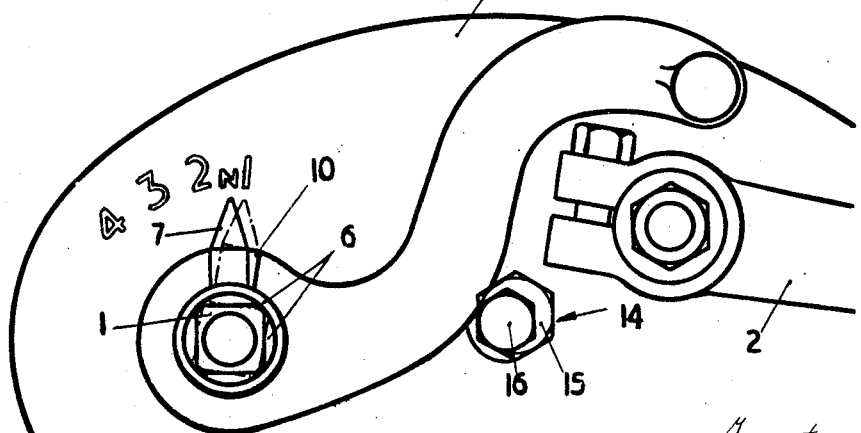
Figure 2 is a similar view to Figure 1 but shows the neutral selecting gear against its stop, part of the mechanism having been removed to expose the lost-motion connection between the said lever and the gear-operating shaft.
Figure 3:
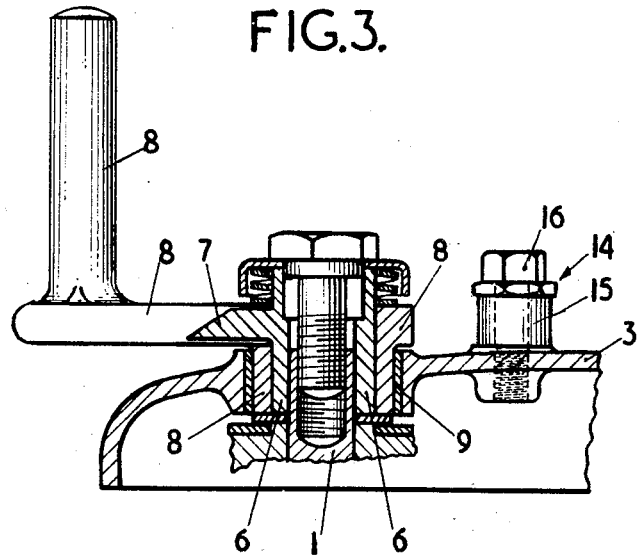
Figure 3 is a section along the line a—a, Figure 1.
Figure 4:
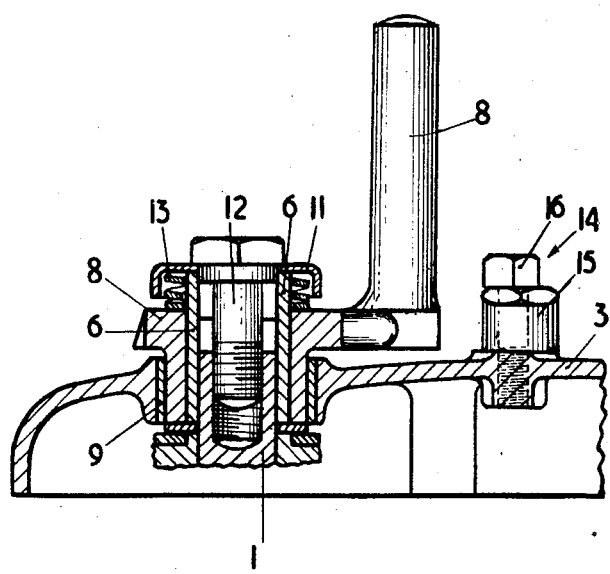
Figure 4 is a section along the line b—b, Figure 1.

The lever hub is retained in position by a cap 11 and a bolt 12 which is secured into the bore of the shaft; a spring 13 is compressed between the cap and hub so as to prevent the lever 8 from rattling against the cover plate, the cap from binding the lever hard against the said plate, and the bolt from working loose in the shaft. In Figure 2 this cap spring and bolt have been removed to expose the said lost-motion arrangement.

A stop 14 is provided upon the cover plate in the path of the neutral-selecting lever, the location of the stop being such that when the lever is taken into abutment therewith, the shaft is turned so as to be located in its neutral selecting position. The stop consists of a collar 15 which is disposed eccentrically around a bolt 16 screwed in to the cover plate, and which is clamped between the head of the said bolt and the surface of the cover plate. Thus the stop is capable of adjustment relatively to the neutral-selecting lever.

When the gear box is in neutral, the levers 2 and 8 are in the positions shown in full lines in Figure 2. To engage bottom gear, the gear selecting lever 2 is raised by foot through a predetermined angle and imparts a clockwise movement to the shaft 1. Since the neutral-selecting lever is impacted against the stop 14 and cannot partake of this clockwise movement, the lost-motion connection between the shaft and spindle becomes effective and the shaft and the pointer are turned relatively to the lever, to the chain-dotted position shown in Figure 2.

To turn the gear-selecting shaft from its neutral position to the position wherein it causes second or the next higher gear to be engaged, the lever 2 is depressed through a predetermined angle and imparts anti-clockwise movement to the shaft, this anti-clockwise movement being transmitted through the bush 6 and the pointer 7, to the neutral-selecting lever. Each successive depression of the lever 2, causes a still higher gear to be engaged by the rotational movement of the gear-selecting shaft until, as shown in Figure 1, top gear is engaged. No matter what higher gear is engaged at any given time, neutral can be obtained quickly and easily and without requiring any skill on the part of the driver, merely by depressing the neutral-selecting lever into contact with the stop 14.

In the arrangement shown in the drawings, the neutral-selecting lever is so disposed that it is adapted to be operated readily by the driver's heel; alternatively it may be coupled, through suitable links, to a hand-operated control. Moreover, the arrangement has the advantage that, without any great difficulty, it may be applied to any existing gear box wherein the gear-operating shaft and gear-selecting lever are adapted to be rocked about different axes.

I have illustrated and described one embodiment of my invention, but it will be understood that the invention may be otherwise embodied or practised within the scope of the following claims.

Having described my invention, what I claim and desire to secure by Letters Patent is:

1. For a gear box comprising a gear-engaging lever arranged to operate a gear-selecting shaft through an intermediate mechanism, neutral selecting means comprising an auxiliary lever mounted on the said shaft externally of the gear box, a stop which is arranged in the path of the said auxiliary lever and which is so disposed as to locate the lever and shaft in their neutral selecting positions when the lever is taken into abutment with the stop, and a lost motion device between the shaft and the auxiliary lever to permit of a limited movement of the shaft beyond its neutral position under the action of the gear-selecting lever.

2. For a gear box comprising a gear-selecting lever arranged to operate a gear-selecting shaft through intermediate mechanism, the said shaft being rotatable about a different centre from that of the said lever, the provision of neutral selecting means comprising an auxiliary lever mounted on the said shaft, and a rigid stop adjustably mounted on the outside of the box in the path of the auxiliary lever and so arranged that when the auxiliary lever is taken into abutment with the said stop, the said auxiliary lever and gear selecting shaft are located in their neutral positions.

3. For a gear box comprising a gear-selecting lever arranged to operate a gear-selecting shaft through intermediate mechanism, the said shaft being rotatable about a different centre from that of the said lever, the provision of neutral selecting means comprising an auxiliary lever mounted on the said shaft and connected thereto through a lost motion device, and a rigid stop adjustably mounted on the outside of the box in the path of the said auxiliary lever is so located that when the auxiliary lever is displaced into contact with the stop, the said shaft is taken into its neutral position, the said lost motion device permitting of a limited movement of the shaft beyond said neutral position.

4. For a gear box comprising a gear-selecting lever adapted to operate a gear-selecting shaft through intermediate mechanism, the said shaft and the hub of the gear selecting lever being rotatable about different centre lines, the provision of neutral selecting means comprising a sleeve non-rotatably mounted on the shaft, an auxiliary lever mounted around the said sleeve and having a radial aperture in its hub, a projection from the said sleeve engaging the said aperture for transmitting drive between the auxiliary lever and the said shaft, and a stop disposed in the path of movement of the auxiliary lever and so located that the displacement of the auxiliary lever into abutment with the stop takes the said shaft to its neutral position.

5. For a gear box comprising a gear-selecting lever adapted to operate a gear-selecting shaft through intermediate mechanism, the said shaft and lever being displaceable about different centre lines, the provision of neutral selecting means comprising a sleeve non-rotatably mounted on the said shaft, an auxiliary lever rotatably mounted around the said sleeve and having a radial aperture in its hub, a projection from the said sleeve which engages but is narrower than the said aperture so that the shaft may make a limited rotational movement relatively to the hub, and a stop so disposed in the path of movement of the auxiliary lever that when the latter is taken into abutment with the said stop it transmits drive to the shaft through the said projection and locates the said shaft in its neutral position.

6. For a gear box comprising a gear-selecting lever adapted to operate a gear-selecting shaft through intermediate mechanism, the said lever and shaft being displaceable about different centre lines, the provision of neutral selecting means comprising a sleeve non-rotatably mounted upon the said shaft and having a radial projection therefrom, a lever rotatably mounted on the said sleeve and having a radial aperture in its hub which is engaged by and is wider than the said projection, the sleeve being of a length such that it extends beyond the shaft end and the said lever hub, a coil spring disposed around the projecting sleeve end and compressed between a cap and the said lever hub, a bolt coaxial to and engaging the said shaft with its head abutting and retaining the said cap in contact with the projecting sleeve end, and a stop so located in the path of the auxiliary lever that when the latter is taken into abutment with the said stop, it drives the said shaft, through the medium of said projection, into its neutral position.

7. For a gear box comprising a gear-engaging lever arranged to operate a gear-selecting shaft through an intermediate mechanism, neutral selecting means comprising an auxiliary neutral selecting lever mounted on the said shaft, and a rigid stop mounted on the gear box in the path of movement of the said auxiliary lever and in such a position that when the auxiliary lever is moved into contact with the said stop, it takes the gear-selecting shaft to its neutral position.

8. For a gear box comprising a gear-selecting lever adapted to operate a gear-selecting shaft through intermediate mechanism, the said shaft and the hub of the gear selecting lever being rotatable about different centre lines, the provision of a neutral selecting auxiliary lever, a rigid but adjustable stop mounted externally of the box in the path of the auxiliary lever, and a lost motion device provided between the auxiliary lever and the shaft for permitting a limited movement of the shaft after the lever has been taken into abutment with the said stop to locate the shaft in its neutral position.

9. For a gear box comprising a gear-selecting lever arranged to operate a gear selecting shaft through an intermediate mechanism, neutral selecting means comprising an auxiliary neutral selecting lever mounted on the said shaft and a stop rigid upon the gear box, the said stop comprising a collar disposed eccentrically upon a bolt screwed to the box and clamping the said collar between the bolt head and the box surface, the collar being located in the path of movement of the auxiliary lever in such a position that when the auxiliary lever is moved into contact with the collar, it takes the gear selecting shaft to the neutral position.

WILLIAM H. HILL.

REFERENCES CITED

The following references are of record in the file of this patent:

UNITED STATES PATENTS

| Number | Name | Date |
|---|---|---|
| 1,300,874 | Randol | Apr. 15, 1919 |
| 1,373,547 | Beemer | Apr. 5, 1921 |
| 1,771,608 | Benzing | July 29, 1930 |
| 2,094,163 | Weber | Sept. 28, 1937 |